Patented July 23, 1940

2,208,557

UNITED STATES PATENT OFFICE 2,208,557

PREPARATION OF ALDEHYDES AND KETONES

James L. Amos and George W. Hooker, Midland, Mich., assignors to The Dow Chemical Company, Midland, Mich., a corporation of Michigan No Drawing. Application November 16, 1938, Serial No. 240,708

10 Claims. (Cl. 260—593)

This invention relates to an improved process for the preparation of aliphatic aldehydes and ketones by the pyrolysis of aliphatic halohydrins.

It is known (cf. Krassuski, J. Russ. Phys. Chem. Soc., 34, 287 (1902)) that aliphatic chlorohydrins, e. g. ethylene chlorohydrin, propylene chlorohydrin, trimethylethylene chlorohydrin, etc., may be decomposed to form the corresponding aldehydes and/or ketones by heating with water at reflux temperature or thereabouts. The reaction in the case of ethylene chlorohydrin takes place according to the equation:

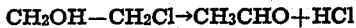

$$CH_2OH-CH_2Cl \rightarrow CH_3CHO + HCl$$

In a similar manner, a mixture of isomeric propylene chlorohydrins may be decomposed to form propionaldehyde and acetone. While it is possible to obtain small amounts of the desired aldehydes and ketones by the removal of hydrogen chloride from chlorohydrins in such manner, the process as heretofore practiced possesses a number of disadvantages which render it unsuited for commercial usage on a large scale. For example, when the lower aliphatic chlorohydrins, e. g. ethylene and propylene chlorohydrins, are heated with water at reflux temperature, the reaction takes place very slowly and a low yield of the desired products is obtained because of the formation of by-products, such as glycols. When an attempt is made to increase the speed of reaction by raising the reaction temperature, the product obtained contains a considerable proportion of tars, polymerized aldehydes, glycols, etc. Somewhat better yields of aldehydes and ketones are obtained by decomposing the higher chlorohydrins, e. g. butylene chlorohydrin, hexylene chlorohydrin, etc. in the known manner, but in any case the reaction takes place slowly and at best requires heating over a period of several hours.

It is an object of this invention to provide a process whereby an aliphatic halohydrin can be converted almost entirely into the corresponding aldehyde and/or ketone. Another object is to provide such a process which can be effected rapidly and which is adapted to continuous operation. A particular object of the invention is to provide a continuous process for the rapid production of acetaldehyde and of propionaldehyde and acetone from ethylene and propylene halohydrins respectively.

We have now found that by effecting the pyrolysis of aliphatic halohydrins in the presence of surface catalysts, such as activated alumina or charcoal, at temperatures between about 250° C. and about 700° C., the corresponding aldehydes and ketones are produced in good yield and with a minimum of by-product formation. The reaction takes place smoothly and rapidly, and is well-adapted for continuous operation on a commercial scale.

In preparing aldehydes and/or ketones from halohydrins, according to the invention, an aqueous solution of an aliphatic halohydrin, e. g. ethylene chlorohydrin, propylene bromohydrin, isobutylene chlorohydrin, trimethylethylene bromohydrin, etc., is usually distilled, and the vapors are conducted through a catalyst contact zone maintained at the desired temperature and thence into a suitable cooling system to condense the products. The liquid condensate, comprising an aqueous solution of a hydrogen halide together with the aldehyde and ketone products and a small proportion of unreacted halohydrin, is then fractionally distilled or treated chemically to separate the products, and the unreacted halohydrin is returned to the reaction. If desired, the vaporization step may be omitted and the halohydrin solution may be injected directly in liquid form into the heated reaction zone where it is simultaneously vaporized and pyrolyzed. Also, the reaction may be carried out by mixing the halohydrin, preferably in the vapor phase, with superheated steam in an amount and at a temperature sufficiently high to produce in the resulting gaseous mixture a temperature within the range desired, substantially all of the heat being supplied by the steam; conducting the hot gaseous mixture through the catalyst contact zone; and thereafter passing the reaction products into the cooling system.

The proportion of water or steam to be mixed with the halohydrin varies somewhat with the reaction temperature and with the particular halohydrin employed but is usually between about 4 and about 20 parts by weight of water or steam per part of the halohydrin. The temperature maintained in the reaction zone should be between about 250° C. and about 700° C. and is preferably between about 350° C. and about 600° C. Suitable catalysts for the reaction are the porous surface catalysts such as are commonly employed in dehydrohalogenation reactions. Examples of such materials are calcium carbonate, silica gel, magnesium oxide, calcium chloride, kaolin, pumice, diatomaceous earths, fuller's earth, and other argillaceous and siliceous materials.

The following examples illustrate several ways in which the principle of the invention has been applied, but are not to be construed as limiting the same:

EXAMPLE 1

The following Table I presents data obtained in a number of experiments wherein dilute aqueous solutions of ethylene chlorohydrin were pyrolyzed to form acetaldehyde according to the invention. In each experiment, an ethylene chlorohydrin solution was vaporized, and the vapors were led through a 3/4" glass tube loosely packed with the catalyst and supported vertically in an electric furnace. The temperature within the furnace was determined by means of an iron-constantan thermocouple. The vapors issuing from the reaction tube were condensed in a trap cooled with a mixture of solid carbon dioxide and acetone, and the condensate was analyzed for acetaldehyde. The table gives the quantity and concentration in per cent by weight of the ethylene chlorohydrin solution used in each experiment, the identity of the catalyst employed, the temperature inside of the furnace surrounding the catalyst bed, and the yield of acetaldehyde based on the ethylene chlorohydrin employed.

The invention is not only applicable to the pyrolysis of aqueous solutions of pure aliphatic halohydrins but may also be applied to mixtures of halohydrins and dihalides such as are obtained by reaction between olefines and hypochlorous acids since, as shown in the co-pending application of J. L. Amos, Serial No. 117,579, filed December 24, 1936, the olefine dihalides, e. g. ethylene dichloride, propylene dibromide, etc., are also capable of being pyrolyzed under the conditions of the present process to form aldehydes.

In the following claims, the term "halohydrin" is employed as a generic term to include both chlorohydrins and bromohydrins.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The process which comprises passing a lower aliphatic mono-halohydrin selected from the

Table I

| Experiment No. | Concentration of aqueous ethylene chlorohydrin | Weight of ethylene chlorohydrin solution | Catalyst | Furnace temperature | Yield of acetaldehyde |
|---|---|---|---|---|---|
| | Percent | Grams | | °C. | Percent |
| 1 | 13.1 | 150 | Calcium carbonate | 350 | 70.0 |
| 2 | 13.1 | 130 | ....do.... | 400 | 72.4 |
| 3 | 13.1 | 135 | Silica | 400 | 79.0 |
| 4 | 8.0 | 130 | Calcium carbonate | 400 | 82.2 |
| 5 | 12.4 | 142 | ....do.... | 425 | 80.0 |
| 6 | 8.0 | 130 | Silica | 500 | 97.0 |
| 7 | 8.0 | 130 | ....do.... | 600 | 71.8 |

EXAMPLE 2

Table II, below, presents data obtained in several experiments wherein dilute aqueous propylene bromohydrin, prepared by reaction between propylene and hypobromous acid, was pyrolyzed to form propionaldehyde and acetone. The experiments were carried out as in Example I, with the exception that the vaporization step was omitted, the bromohydrin solutions being passed directly into the reaction tube at a rate of about 2.0 cc. per minute. The table gives the quantity and concentration in per cent by weight of the propylene bromohydrin solution used in each experiment, the identity of the catalyst employed, the temperature inside the furnace surrounding the catalyst bed, the combined yield of propionaldehyde and acetone, and in Experiments 4, 5, and 6, the separate yields of propionaldehyde and acetone. All yields are based on the weighe of propylene bromohydrin employed.

group consisting of chloro- and bromohydrins in admixture with steam over a surface catalyst at a temperature between about 250° C. and about 700° C.

2. The process which comprises passing an aliphatic mono-halohydrin selected from the group consisting of ethylene and propylene chloro- and bromohydrins in admixture with steam over a surface catalyst at a temperature between about 250° C. and about 700° C.

3. The process which comprises passing a vapor mixture of an aliphatic monohalohydrin selected from the group consisting of ethylene and propylene chloro- and bromohydrins and steam into contact with a surface catalyst heated to a temperature between about 250° C. and about 700° C.

4. The process which comprises passing an ethylene monohalohydrin selected from the group consisting of chloro- and bromohydrins in admixture with steam over a surface catalyst at a temperature between about 250° C. and 700° C.

Table II

| Experiment No. | Concentration of propylene bromohydrin solution | Weight of propylene bromohydrin solution | Catalyst | Furnace temperature | Yield of propionaldehyde | Yield of acetone | Total yield |
|---|---|---|---|---|---|---|---|
| | Percent | Grams | | °C. | Percent | Percent | Percent |
| 1 | 13.1 | 125 | Activated charcoal | 250 | | | 61.7 |
| 2 | 13.1 | 125 | ....do.... | 325 | | | 57.2 |
| 3 | 13.1 | 125 | ....do.... | 350 | | | 58.3 |
| 4 | 24.2 | 109 | Alumina | 268 | 13.1 | 40.9 | 54.0 |
| 5 | 24.3 | 110 | Activated charcoal | 252 | 15.9 | 53.4 | 69.3 |
| 6 | 24.2 | 109 | Calcium carbonate | 437 | 5.3 | 76.7 | 82.0 |

5. The process which comprises passing a propylene monohalohydrin selected from the group consisting of chloro- and bromohydrins in admixture with steam over a surface catalyst at a temperature between about 250° C. and 700° C.

6. The process which comprises distilling an aqueous solution of an aliphatic monohalohydrin selected from the group consisting of ethylene and propylene chloro- and bromohydrins, and passing the vapors thereof over a surface catalyst at a temperature between about 250° C. and about 700° C.

7. The process which comprises introducing an aqueous solution of an aliphatic monohalohydrin selected from the group consisting of ethylene and propylene chloro- and bromohydrins into a reaction zone charged with a surface catalyst and heated at a temperature between about 250° C and 700° C.

8. The process which comprises mixing the vapors of an aliphatic monohalohydrin selected from the group consisting of ethylene and propylene chloro- and bromohydrins with superheated steam supplied at a temperature and in an amount sufficient to produce in the resulting gaseous mixture a temperature between about 250° C. and about 700° C., and thereafter contacting the heated mixture with a surface catalyst.

9. The process for the preparation of acetaldehyde which comprises contacting the vapors of ethylene chlorohydrin in admixture with from about 4 to about 20 parts by weight of steam with silica at a temperature of approximately 500° C.

10. The process for the simultaneous production of propionaldehyde and acetone which comprises contacting the vapors of propylene bromohydrin in admixture with from about 4 to about 20 parts by weight of steam with activated charcoal at a temperature between about 400° C. and about 450° C.

JAMES L. AMOS.
GEORGE W. HOOKER.